Feb. 7, 1933.     R. W. BROWN     1,896,880
DEMONSTRATING DEVICE
Filed July 27, 1931
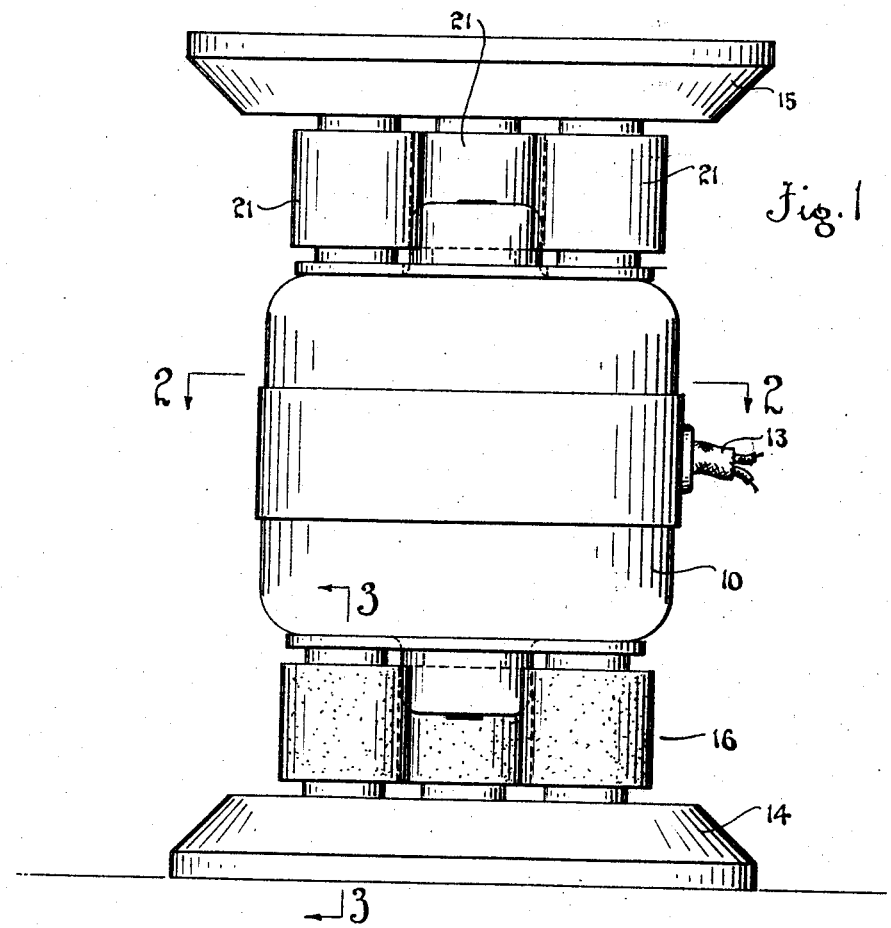
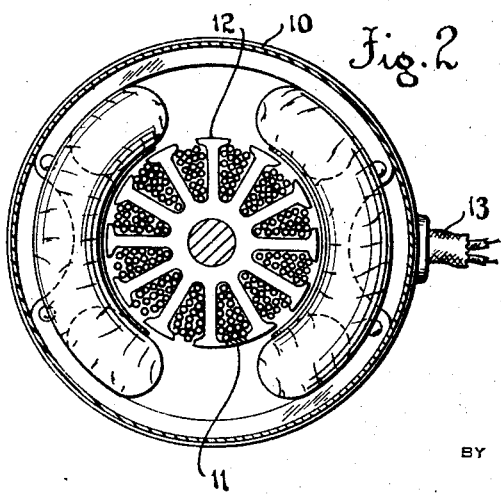
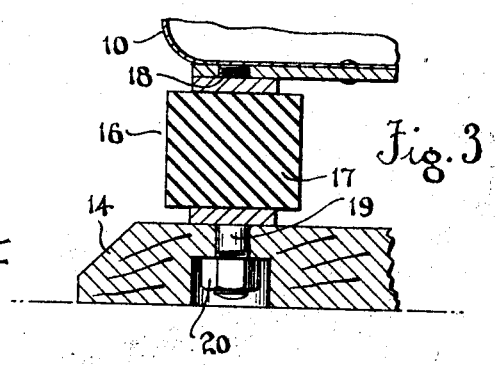
INVENTOR
Roy W. Brown
BY Ely Barrow
ATTORNEYS Patented Feb. 7, 1933

1,896,880

UNITED STATES PATENT OFFICE

ROY W. BROWN, OF AKRON, OHIO, ASSIGNOR TO THE FIRESTONE TIRE & RUBBER COMPANY, OF AKRON, OHIO, A CORPORATION OF OHIO

DEMONSTRATING DEVICE

Application filed July 27, 1931. Serial No. 553,324.

This invention relates to demonstrating devices, and more especially it relates to devices for visibly demonstrating the superiority of rubber as a medium for damping or absorbing the vibrations of a vibrating body. The superiority of rubber as a vibration dampener is demonstrated, in the device constituting this invention, by the use of metal in the same relative position as the rubber, so that the relative merits of the two materials readily may be demonstrated.

The chief objects of the invention are to provide a simple and compact device for demonstrating the ability of rubber to absorb vibrations; and to demonstrate the relative merits of metal and rubber as a means for supporting vibrating bodies. Other objects will be manifest.

Of the accompanying drawing:

Figure 1 is a side elevation of a device embodying the invention, in its preferred form;

Figure 2 is a section on the line 2—2 of Figure 1; and

Figure 3 is a section on the line 3—3 of Figure 1.

Referring to the drawing, there is shown a relatively small, portable electric motor 10 which may be of standard construction, but preferably is provided with an unbalanced rotor so as to vibrate excessively when driven. The unbalanced condition of the rotor may be effected in any suitable manner, one way being shown in Figure 2 wherein a small piece of metal 11 such as solder is secured to the periphery of the armature 12 of the motor. The motor is provided with the usual conductor cord 13 by which is may be attached to any convenient electrical outlet.

The motor is arranged to rotate on a vertical axis and to this end is provided with respective base members 14, 15 which may be of wood, said base members being identical in size and shape, and disposed concentrically of the motor at opposite ends thereof. The base member 14 is secured to the motor 10 by a plurality of connectors 16, 16, herein shown as three, which are symmetrically arranged about the axis of the motor. Each coupling 16 comprises a cylindrical block of resilient rubber 17 that has a short threaded stud 18 secured to one of its ends and threaded into the casing of the motor 10, and has a stud bolt 19 secured to its opposite end and attached to the base member 14 by a nut 20. The arrangement is such that the motor is insulated from the base member 14 by resilient rubber.

At the opposite end of the device the base member 15 is attached to the motor by a plurality of connectors 21, 21 preferably of the same number, size, and shape as the connectors 16, but composed entirely of metal so as to constitute a rigid connection between the motor and base member 15.

The operation of the device consists in connecting the motor to a suitable source of power to drive it, and then positioning it first on one base member and then on the other. The unbalanced condition of the rotor of the motor causes the latter to vibrate excessively, and when the motor is positioned upon the member 15 as a base the vibration is transmitted through the connectors 21 to the base with the result that the device creeps along the surface upon which it is placed. When the device is reversed so as to utilize the member 14 as a base, the vibration of the motor substantially is absorbed or damped out by the rubber blocks 17 so that little or no vibration is transmitted to the base member 14, with the result that the device remains stationary.

The device is of simple construction, may be small enough to be readily portable, and it clearly demonstrates the ability of rubber to absorb or damp out vibration.

The device is susceptible of modification without departing from the spirit of the invention or the scope of the appended claims.

What is claimed is:

1. A demonstrating device comprising a vibratory body, and a rigid and a resilient support secured to said body upon which it may be alternatively positioned.

2. A demonstrating device comprising an unbalanced rotary member, and a rigid and a resilient support upon which said member may be alternatively positioned.

3. A demonstrating device comprising an electric motor having an unbalanced rotor, and a rigid and a resilient structure adapted alternatively to support the motor on a vertical axis.

4. A demonstrating device comprising a vibratory electric motor, base members at opposite ends thereof upon which the motor may be alternatively supported, a rigid connection between the motor and one base member, and a rubber connection between the motor and the other base member.

5. In a device of the character described, the combination of an electric motor having an unbalanced rotor arranged to rotate upon a vertical axis, base members at opposite ends thereof upon which the motor is alternatively supported, a plurality of rigid connections symmetrically arranged about the axis of the motor at one end thereof connecting the motor to one base member, and a plurality of similarly arranged resilient connections at the other end of the motor connecting it to the other base member.

6. In a device of the character described, the combination of an unbalanced rotary member having a vertical axis, and a resilient and a rigid support at the respective ends of said axis upon which said rotary member alternatively is positioned.

In witness whereof I have hereunto affixed my signature this 21st day of July, 1931.

ROY W. BROWN.